United States Patent [19]
Beckstrom et al.

[11] 4,117,944
[45] Oct. 3, 1978

[54] BACKHOE MOUNTING ASSEMBLY

[75] Inventors: Harold K. Beckstrom; James J. Bauer, both of Lisbon; James O. Morehouse, Havana; Orlan J. Loraas, Lisbon, all of N. Dak.

[73] Assignee: Clark Equipment Company, Buchanan, Mich.

[21] Appl. No.: 789,892

[22] Filed: Apr. 22, 1977

[51] Int. Cl.² .............................................. E02F 3/72
[52] U.S. Cl. ................................ 214/131 A; 172/272; 280/163; 214/145 A
[58] Field of Search ........... 214/131 A, 138 R, 138 C, 214/145 R, 145 A, DIG. 5, DIG. 7, DIG. 12; 180/77 S; 280/163; 172/272, 273

[56] References Cited

U.S. PATENT DOCUMENTS

| 2,634,989 | 4/1953 | Skreberg | 280/163 X |
| 3,606,052 | 9/1971 | Schurz | 214/145 A |
| 3,732,996 | 5/1973 | Bauer | 214/131 A |
| 3,753,508 | 8/1973 | Carpenter | 214/145 A X |
| 3,892,322 | 7/1975 | Drennhaus | 214/138 R X |
| 3,984,016 | 10/1976 | Kuhn | 214/131 A |

FOREIGN PATENT DOCUMENTS 257,364  4/1970  U.S.S.R. ............................... 180/77 S

Primary Examiner—L. J. Paperner
Attorney, Agent, or Firm—Ernst H. Ruf

[57] ABSTRACT

A backhoe mounting assembly for a skid steer loader. A backhoe mounting assembly is provided for securing a backhoe to the front end of a skid steer loader at a forward end portion of the boom lift arms of the loader. A latch attachment provided on the frame of the loader engages an upper part of the mounting assembly and an implement carrying attachment on the loader lift arms engages the lower part of the assembly. Provision is made in the mounting assembly for disabling both the boom lift arms and a tilt cylinder associated with the implement carrying attachment when the backhoe mounting assembly is secured in place. Guide rails which support the operator's seat within the operator's compartment have been extended to enable the operator to use the seat of the vehicle from which to operate the backhoe, thereby keeping the operator within the confines of the operator's compartment when the backhoe is being run and providing the backhoe user with the protection of the overhead guard of the operator's compartment.

10 Claims, 6 Drawing Figures

BACKHOE MOUNTING ASSEMBLY

BACKGROUND OF THE INVENTION

1. Field of the Invention

The present invention is directed to skid steer vehicles and more particularly to a mounting assembly for securing a backhoe to a skid steer loader.

2. Description of the Prior Art

One of two patents directed specifically to the mounting of a backhoe implement on a skid steer vehicle is U.S. Pat. No. 3,732,996 issued to James J. Bauer on May 15, 1973 and assigned to the assignee of the present invention. The backhoe mounting assembly shown therein is coupled to the frame of the vehicle as well as an implement carrier pivotally mounted on the boom lift arms of the vehicle. In the U.S. Pat. No. 3,732,996 the backhoe mounting assembly is pinned to the frame at a pair of vertically spaced connections provided at the forward end of the frame. The backhoe is substantially supported by the frame in this application and the implement carrier can be disengaged from the backhoe when the backhoe is mounted on the vehicle.

The second U.S. Pat. No. 3,984,016 issued to Patrick Kuhn on Oct. 5, 1976 and assigned to the assignee of the present invention discloses another means of mounting a backhoe. In particular, the mounting means of the U.S. Pat. No. 3,984,016 utilizes the implement carrier and the boom lift arms of the vehicle as more than a mounting and demounting means for the backhoe. Specifically, the device set forth in the U.S. Pat. No. 3,984,016 utilizes the lift arms of the skid steer vehicle as a support means for the backhoe, thereby providing greater mobility of the skid steer vehicle when the backhoe is mounted thereon.

However, it is recognized that there are certain disadvantages in the backhoe mounting assemblies of both of the aforementioned patents. For example, in both of the prior art devices the backhoe mounting assembly includes an operator's space disposed outside the skid steer vehicle. It would be more economical and more advantageous to utilize the operator's compartment of the skid steer vehicle as the operating module of the backhoe. Such an arrangement would place the operator within the confines of the overhead guard overlying the operator's compartment of the skid steer vehicle as well as eliminate the need for an extra operating seat mounted on the backhoe. Such an arrangement offers more protection to the operator and makes the backhoe less bulky, less complex and less expensive.

Unlike the prior art, the present invention defines a separate backhoe mounting frame which operates as an intermediate connection between the vehicle and the backhoe. That is, in each of the prior art patents discussed the backhoe and its mounting assembly was a self-contained unit, with various modifications made in the skid steer vehicle to accommodate the mounting thereon of the backhoe assembly. In the present invention a separate backhoe mounting frame is provided. Thus, the vehicle can remain standard with a first set of standard mounting surfaces between the vehicle and the mounting frame and a second set of standard mounting surfaces between the mounting frame and the backhoe attachment. If minor modifications are required in the backhoe mounting frame to accommodate any change in the design of the basic backhoe, the mounting frame can be modified without changing the skid steer vehicle or the connecting points between the vehicle and the mounting frame.

SUMMARY OF THE INVENTION

The present invention provides a backhoe mounting assembly, including a backhoe mounting frame secured to a skid steer loader, said mounting frame in turn mounting and securing a backhoe thereon. The skid steer loader may be similar to the vehicle disclosed in U.S. Pat. No. 3,866,700 issued to James J. Bauer on Feb. 18, 1975 and assigned to the assignee of the present invention. In the present invention the backhoe mounting frame is secured to the vehicle at an upper mounting point by a backhoe mounting bracket specially mounted on the vehicle and at a lower mounting point by an implement carrying apparatus carried at a forward end of the boom lift arm assembly of the vehicle. The sequence associated with the mounting of the backhoe mounting assembly onto the vehicle is similar to that shown in FIGS. 7, 8, 9, and 10 of U.S. Pat. No. 3,984,016 and described in columns 3 and 4, lines 62 to 68 and lines 1-24 of that patent. To the extent that they further the understanding of the present invention, the above-mentioned portions of the U.S. Pat. No. 3,984,016 are herein incorporated by reference. In addition, the seat rails supporting the operator's seat have been extended to enable the backhoe operator to move substantially forward in the operator's compartment to oversee the operation of the backhoe.

The backhoe mounting frame comprises a base structure which is slightly less wide than the distance between the boom arms and slightly higher than the fender of the vehicle. Hand rails provided on the frame extend above the base generally to the height of the skid steer vehicle. However, the base is relatively short from front to rear as viewed from the side of the vehicle. Extending rearwardly from an upper portion of the base is a beam which engages the mounting bracket provided on the skid steer vehicle at the upper mounting point of the frame. A locking mechanism provided on the mounting bracket engages the beam of the mounting frame to lock it in place at the upper mounting point. A lateral projection of the mounting beam extends outwardly to engage an upper side of the boom lift arm so as to immobilize the lift arm. The mounting frame also includes a lower member provided on the base which includes means for engaging the implement carrying apparatus of the boom assembly of the skid steer loader at the lower mounting point of the frame. A protective strut provided at the lower end of the mounting frame engages the implement carrying apparatus so as to lock out the tilt cylinder associated therewith. Associated coupling means secure the backhoe to the mounting frame to complete the assembly.

A more detailed description of the specific embodiment of the present invention is set forth below. Such description, when considered with the accompanying drawings, should enable the reader to have a clearer understanding of the present invention. The drawings may be briefly described as follows:

DETAILED DESCRIPTION OF A PREFERRED EMBODIMENT

Figure 1:
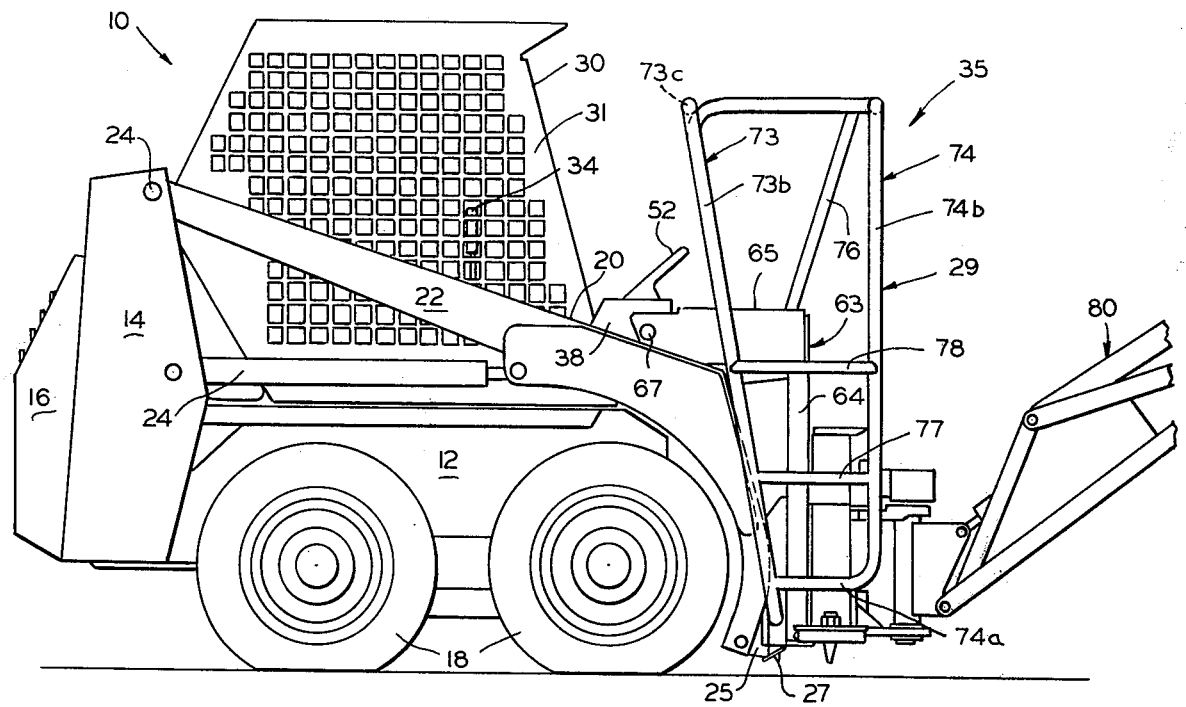
FIG. 1 is a side elevational view of a skid steer loader having the backhoe mounting assembly secured in place and the backhoe mounted thereon, the forward portion of the backhoe being broken away for clarity and because it does not form a part of this invention.

A skid steer vehicle for mounting the preferred embodiment of the present invention thereon is shown in FIG. 1 and comprises the following parts as set forth below.

The skid steer vehicle 10 includes a body portion or frame 12 having uprights or stanchions 14 mounted at the rear thereof on opposite sides of the body portion 12. An engine (not shown) is mounted on the frame 12 at the rear of the vehicle 10 between the uprights 14, and the engine is protected by a rear enclosure including the rear door 16. The engine propels the vehicle as well as provides power for a hydrostatic drive means which controls the wheels of the vehicle. The drive means for the vehicle may take the form of the means set forth in the above-mentioned U.S. Pat. No. 3,866,700 or similar and includes hydrostatic motors driving separate chain and sprocket drives for independently controlling sets of wheels 18 provided on opposite sides of the vehicle 10. Independent hydrostatic controls for each set of drive wheels 18 permits the skid steer operation of the vehicle 10.

Figure 2:
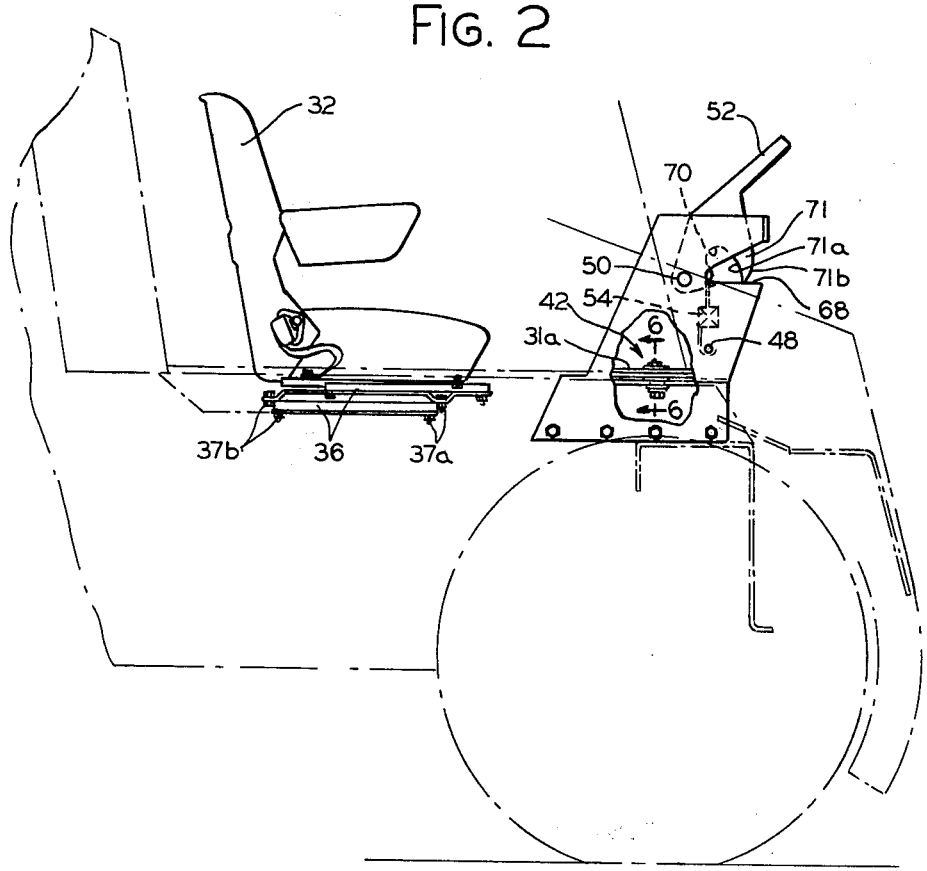
FIG. 2 is a schematic view showing portions of the backhoe mounting assembly in their relative positions on the vehicle, the general outline of the vehicle being shown in phantom lines.

The skid steer vehicle 10 includes a boom assembly 20 comprising a pair of boom lift arms 22 pivotally mounted on respective uprights 14 at their upper ends on mounting points 24. The boom lift arms extend downwardly from the uprights 14 to overlie the front wheels 18 of the vehicle and extend downwardly forward thereof. Hydraulic lift cylinders 24 on opposite sides of the vehicle are pivotally mounted between each upright 14 and a respective lift arm 22 and are used to raise and lower the boom lift arms 22 for loading applications. The lift arms 22 have mounted at a forward end thereof an implement carrying apparatus 25 which can carry a variety of implements but in the present application carries a backhoe mounting frame 29. The apparatus 25 (FIGS. 3 and 4) includes a generally triangular upper edge 25a and a downwardly sloping lower edge 25b. A mechanically actuated wedge 27 is provided adjacent the lower edge 25b. A tilt cylinder 28 is disposed between the boom assembly 20 and the apparatus 25. A cross-tube 25c extends the width of the apparatus 25 and cooperatively engages the frame 29 as will be described below. The vehicle 10 also includes an operator's compartment enclosed by an overhead guard 30. The operator's compartment contains a seat 32 (FIG. 2) as well as operating levers 34 for controlling the opposite sets of wheels 18 of the skid steer vehicle for propelling the vehicle.

The backhoe mounting assembly 35 includes the mounting frame 29 as well as mounting hardware secured to the skid steer vehicle. For example, the skid steer vehicle 10 includes seat rails 36 which are bolted to the frame as at forward bolt locations 37a and rear bolt locations 37b. The rails 36 are substantially longer than the standard seat rails for the vehicle, enabling the operator to move the seat to the forward part of the operator's compartment to oversee the operation of the backhoe when it is secured thereto. Mounted on the vehicle frame at opposite sides thereof are symmetric mounting brackets 38, only one of which will be described in detail. The mounting bracket 38 is a somewhat Z-shaped bracket having a first relatively straight base portion 39 which bolts to the inside of a front portion 15 of the frame 12 of the vehicle. A step portion 40 of the bracket 38 extends outwardly laterally to overlie a top fender or flange 17 of the frame 12. The step 40 of the bracket 38 is interposed between the flange 17, of the frame 12 and a lower flange 31a of a side wall 31 of the overhead guard 30. A mounting assembly 42 holds the side flange 17, the step portion 40 and the flange 31a of the overhead guard 30 in assembled relation. An upper leg 44 of the Z-shaped mounting bracket 38 extends generally perpendicularly from the flange 17. Laterally spaced from the upper leg 44 is a second upper leg portion 46. The upper leg portions 44 and 46 and mounting bracket 38 are held in assembled spaced relation by a lower pin 48 and upper pin 50. Pivotally mounted on the upper pin 50 is a locking mechanism 52 connected to the lower pin 48 by a spring 54.

The mounting assembly 42 comprises a rubber cushion 56 having a center opening 57 and an outside groove 58. The outside groove 58 fits into an opening provided in the flange 17 of the body portion 12. Step portion 40 has an opening therein which loosely receives the cushion 56, and a washer 59 is provided between the lower flange 31a and the rubber cushion 56. End washers 60 and 61 provided at opposite ends of the assembly 42 provide contact surfaces for the nut and bolt combination 62a, 62b which completes the assembly 42.

Figure 3:
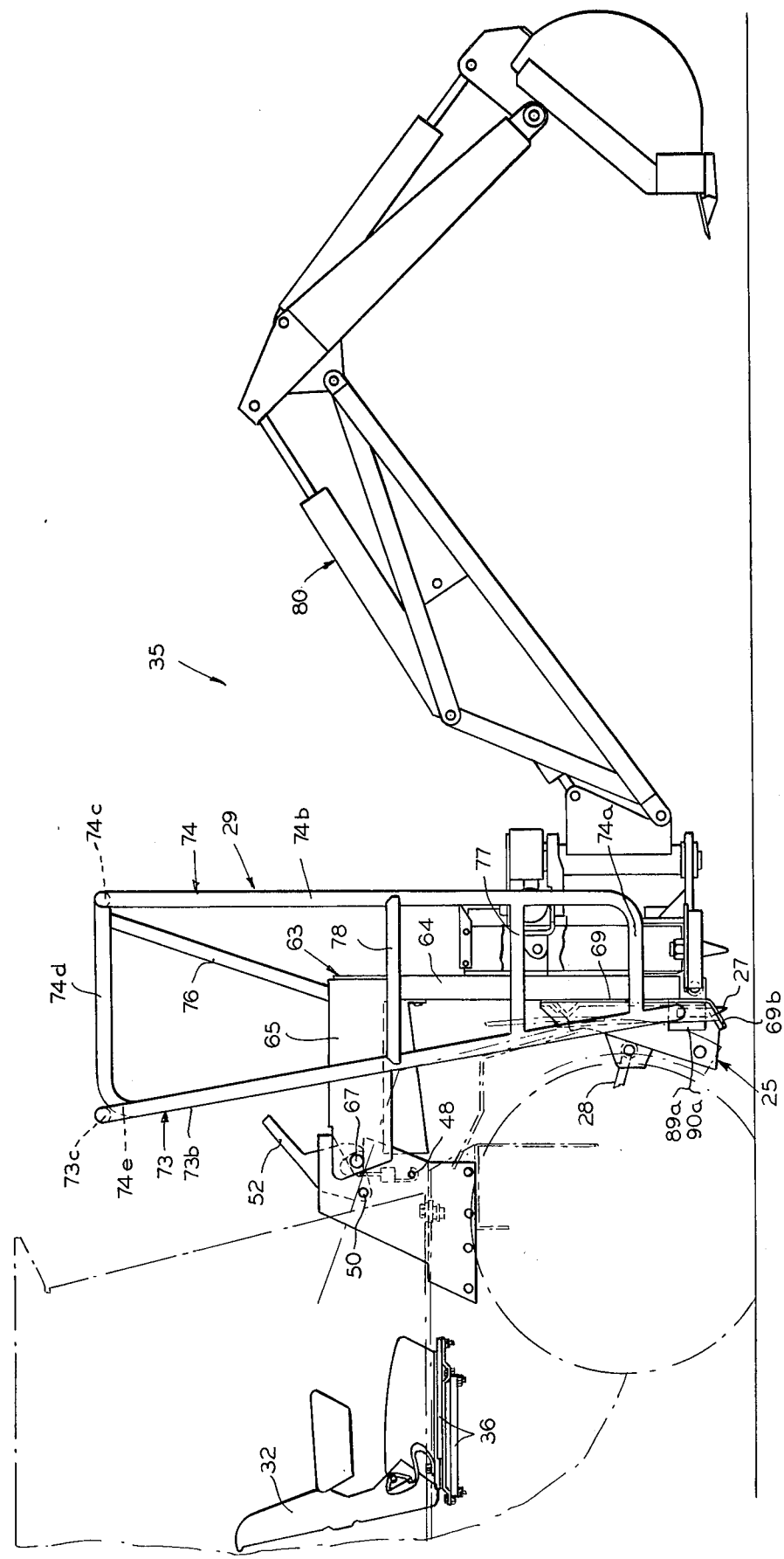
FIG. 3 is a side elevational view wherein the schematic representation of the vehicle shown in FIG. 2 is represented in slightly smaller scale and the backhoe mounting frame with the backhoe connected thereto is shown as mounted in place on the vehicle.
Figure 4:
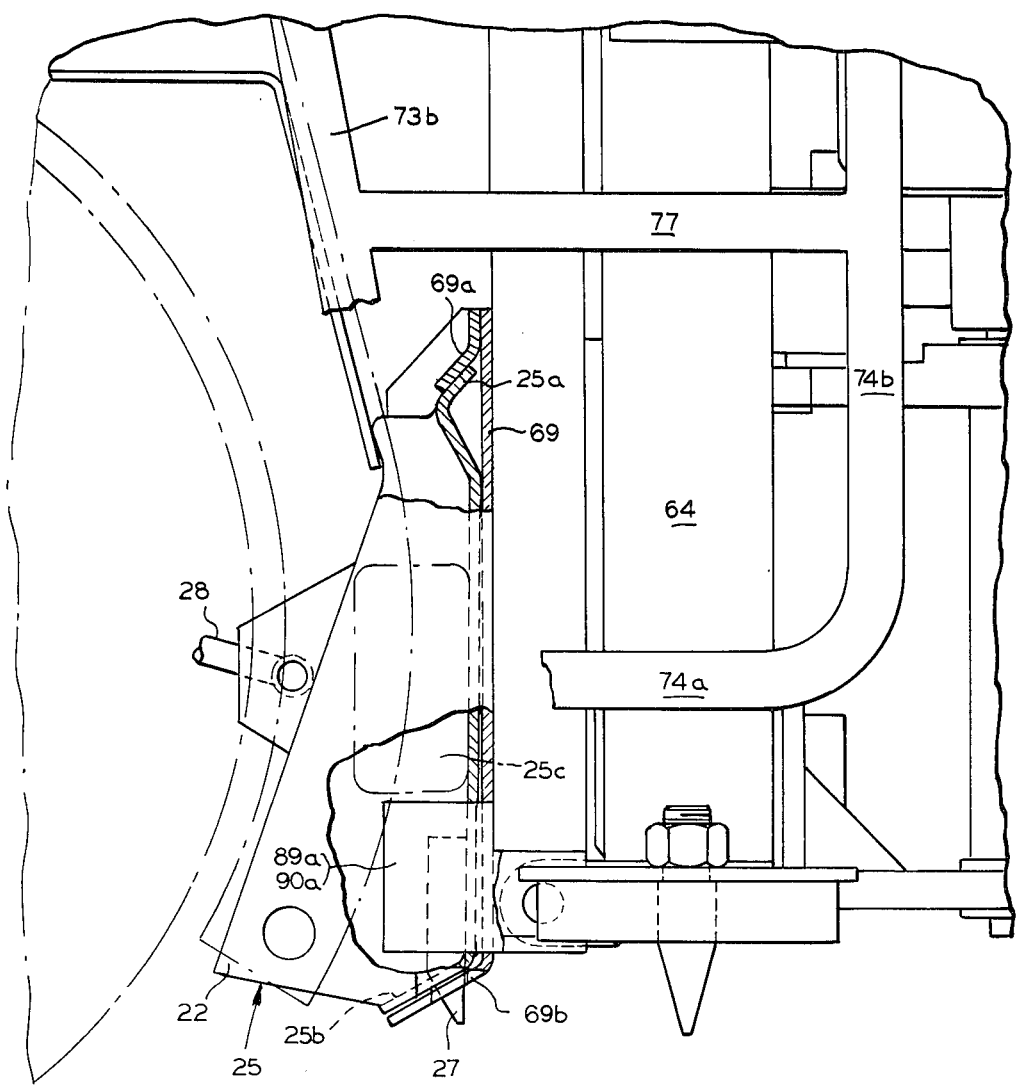
FIG. 4 is an enlarged side elevational view of a lower mounting point for the connection between the mounting frame and the vehicle, with portions thereof removed for clarity.

The mounting frame 29 is best seen in FIGS. 1, 3 and 4. The mounting frame 29 has a base portion 63. The base portion 63 includes a pair of laterally spaced vertical beams 64 which are generally disposed adjacent the inner edges of respective lift arms 22 of the vehicle and aligned with the mounting brackets 38 provided on the vehicle frame. Provided at the respective upper ends of the beams 64 are rearwardly extending support beam 65 which are generally perpendicular to the vertical beams 64. Beams 64 and 65 are channel shaped members fixedly secured together at their respective intersections. A cross-angle 66 secures the laterally spaced beams 64 together at a forward upper portion thereof.

Figure 5:
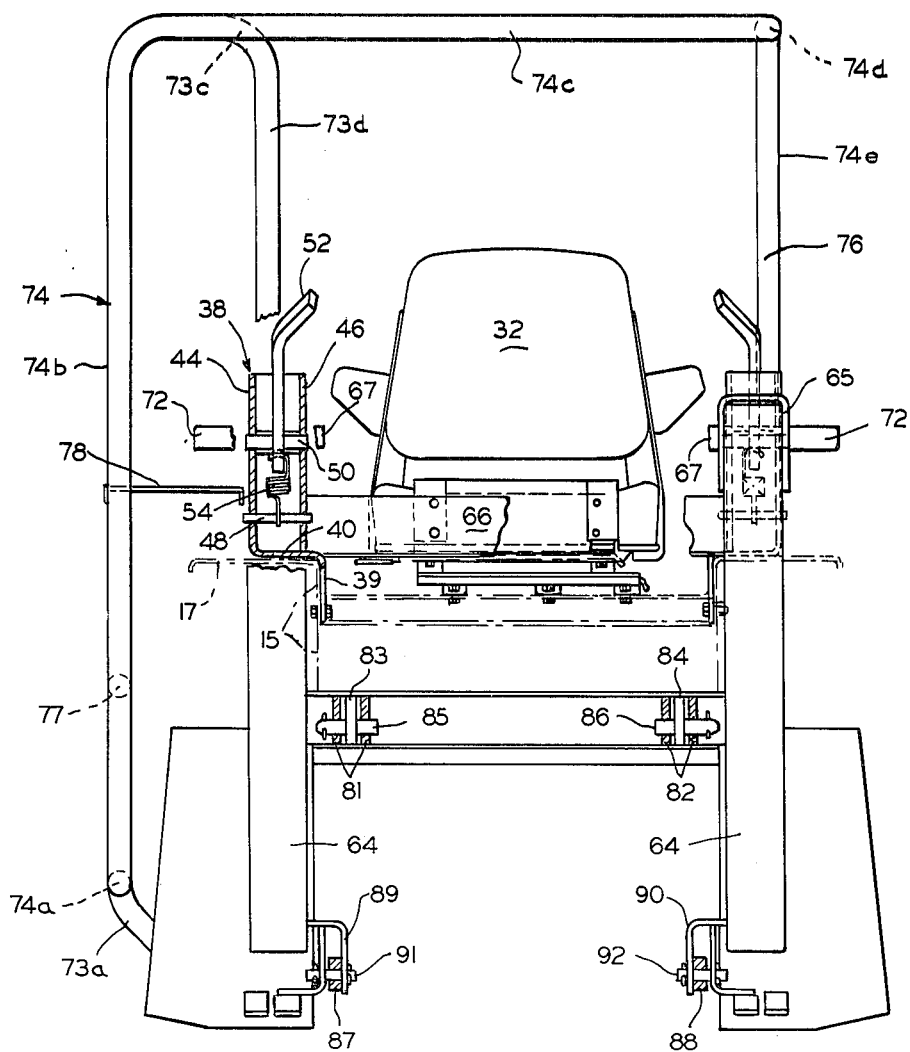
FIG. 5 is an end elevational view, looking to the left of the backhoe assembly set forth in FIG. 3, the backhoe itself being removed from the assembly for clarity.
Figure 6:
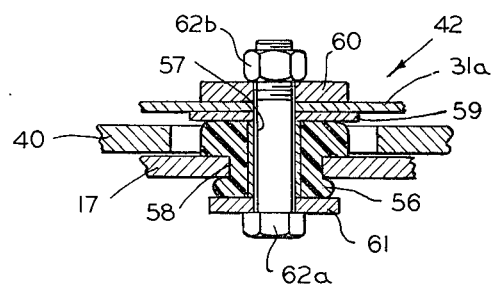
FIG. 6 is a sectional view taken along the lines 6—6 of FIG. 2.

Provided at the rear end of each channel 66 is a pin 67 which engages a slot 68 provided in each mounting bracket 38. The pins 67 comprise an upper mounting point for the frame 29 on the vehicle 10. Each locking member 52 has a slot 70 therein which complements the slot 68 provided on the mounting bracket 38. The outer edge of slot 70 is defined by an extension 71 of the locking member 52, the extension having an inner concave surface 71a and an outer convex surface 71b. Engagement of the pin 67 with the surface 71b of the extension 71 moves the member 52 out of the way to permit the pin 67 to be received in the slot 68. The member 52 can then be closed to retain the pin 62 in fixed relation with the mounting bracket 38. Each pin 67 has a lateral extension 72, best seen in FIG. 5, which extends outwardly of the member 66 to engage an upper surface of a respective boom lift arm 22, so as to prevent the arm from being raised when the mounting frame 28 is mounted on the vehicle 10.

A rear plate 69 of the base 63 includes a pair of downwardly sloped edges 69a and 69b adapted for engagement with the implement carrying apparatus 25 at a lower mounting point of the frame 29 on the vehicle 10.

The frame 29 includes an access ladder having a pair of side rails 73 and 74, enabling an operator to mount and de-mount the vehicle. The rail 73 is provided at the rear end of the mounting frame 29 and is slanted toward the vehicle 10. The rail 73 has a lower end 73a attached to a lower portion of the base 63 of the mounting frame 29 and a vertical section 73b. The upper end of the rail 73 is overlapped to form a U-shaped section 73c having an inner rail 73d which extends downwardly to abut the top surface of the beam 66. The front rail 74 of the mounting frame 29 is an elaborately bent piece of tubing which includes a base portion 74a which curves rearwardly to abut the rail 73 at a lower end to form a bottom step for the ladder 72. A vertical extension 74b of the rail 74 forms a companion rail 74b for the rail 73b of the ladder 72. A lateral extension 74c of the rail 74 extends generally horizontally above the front of the mounting frame 29. A continuous section 74d of the rail 74 extends rearwardly generally in alignment with the channel 66 located on the left hand side of the vehicle. The terminal portion 74e of the rail 74 bends downwardly to abut the channel 66 in general alignment with the rail section 73b adjacent the opposite channel 66. A strut 76 extends from a forward end of the left channel 66 to a forward end of the rail section 74d to support the upper end of the rail 74. In addition to bottom step 74a, the ladder includes steps 77 and 78 secured between opposite vertical sections 73b and 74b. The step 77 is merely a piece of rail extending between the rail section 73b and 74b to provide a foothold for the Bobcat operator. However, the step 78 is a generally wider section mounted between the bottom edge of the channel 66 and the side rails 73b, 74b to form a relatively wide top step of the ladder.

The mounting frame 29 provides means for securing the backhoe 80 to the vehicle 10. Respective clevises 81 and 82 of the backhoe 80 engage projections or plates 83 and 84 of the mounting frame 29. Corresponding holes in the backhoe clevises 81, 82 and the frame mounting plates 83, 84 enable pins 85, 86 to be inserted in place to secure the backhoe 80 to the mounting frame 29 at an upper mounting point. Lower backhoe tabs 87, 88 are inserted between corresponding brackets 89 and 90 of the mounting frame 29. Pins 91 and 92 pass through openings in the brackets 89 and 90 and corresponding openings in the tabs 91, 92 to secure the backhoe 80 to the mounting frame 29 at a lower mounting point. The brackets 89 and 90 include rearwardly directed struts 89a and 90a for a purpose described below.

Operation of the Preferred Embodiment

The backhoe 80 may be mounted on the mounting frame 29 as follows:

Brackets 81 and 82 of the backhoe are aligned with plate 83 and 84 of the frame 29 with the pins 85 and 86 thereafter being mounted in place to secure the backhoe 80 to the frame 29 at the upper mounting point. At the lower mounting point tabs 87 and 88 of the backhoe 80 are inserted into brackets 89 and 90 and the respective pins 91 and 92 are inserted in place to secure the backhoe 80 to the frame 29 at the lower mounting point.

With the backhoe 80 mounted on the frame 29, the backhoe assembly 35 may be secured to the vehicle 10 as follows. With lift arms 22 in the fully lowered position shown in FIG. 1 of the drawing, the vehicle 10 may be moved forward until the implement carrying apparatus 25 engages the rear plate 69 of the base 64 of the mounting frame 29 as best shown in FIG. 3. At the lower mounting point the upper triangular edge 25a of the implement carrying apparatus 25 is received under the upper rear edge 69a of the plate 69. The upper edge 25a of the apparatus 25 engages the upper edge 69a of the plate 69, and the tilt cylinder 28 is retracted to rotate the lower edge 25b of the apparatus 25 into engagement with lower edge 69b of the plate 69.

With the mounting assembly engaged at the lower mounting point the tilt cylinder 28 is engaged to rotate the assembly 25 slightly to urge the pins 67 on respective beams 66 into the slots 68 in respective mounting brackets 38 at the upper mounting point. As each pin 67 is urged rearwardly the thrust of the pin 67 urges the locking member 52 upwardly and forces the pin 67 further into the slot 68 on the mounting bracket 38. When the pin 67 has been urged fully to the rear of the slot 68 the locking member 52 has been pushed upwardly and out of the way. The member 52 then is snapped down by the force of the spring 54 to overlie the pin 67 and firmly hold the pin 67 in the slot 68 provided in the mounting bracket 38 and the slot 70 provided at an inner edge of the locking member 52. With the mounting frame in place on the vehicle 10, lateral extensions 72 of the pins 67 prevent the lift arms 22 of the boom assembly of the vehicle 10 from being raised since the pins 67 are firmly locked in the brackets 38 which are themselves mounted on the vehicle frame 12.

The struts 89a and 90a mounted at a lower end of the base 64 extend rearwardly to engage the cross-tube 25c of the implement carrying apparatus 25 to prevent the tilt cylinder 28 from being further extended. The wedge 27 associated with the apparatus 25 is actuated to slide into an opening on the edge 69b to secure the implement carrying apparatus 25 to the base 64 at the lower mounting point. With the backhoe assembly 35 firmly mounted on the vehicle 10 the seat 32 may be moved to an extreme forward position of the rails 36 to permit the vehicle operator to operate the backhoe 80 within the confines of the envelope provided by the overhead guard 30 of the skid steer vehicle 10.

Thus the present invention provides a new and novel means of securing a backhoe to a skid steer vehicle, the attachment means permitting the vehicle operator to control the device while he is within the confines of the envelope of protection provided by the overhead guard. The backhoe assembly of the present invention further provides a distinct backhoe mounting frame permitting uniformity of connections between the backhoe and mounting frame and standardizing vehicle hardware for backhoe operations. Although we have defined a specific embodiment for the present invention it should be understood that equivalent elements can be substituted for the specific structure recited herein without altering the scope of the invention as defined. The present invention is limited only by the scope and content of the claims set forth below.

We claim:

1. For a tractor vehicle having lift arms pivoted on the vehicle and hydraulic cylinders connected between the vehicle and lift arms for raising and lowering the arms, an attachment mounting assembly including an implement mounting apparatus pivoted on the ends of the lift arms for carrying an attachment and a hydraulic cylinder connected between the lift arms and the implement carrying apparatus for pivoting the apparatus relative to the lift arms, the attachment mounting assembly comprising a mounting frame operatively connected to the vehicle at upper and lower mounting points at a rear end thereof and operatively connected to an implement at upper and lower mounting points at a front end thereof, the connection between the mounting frame and the vehicle comprising a mounting bracket including a member having a base portion and a step portion, the latter overlying a lateral outward projection of a front body portion of the vehicle, a pair of spaced leg portions mounted on the step portion and extending upwardly from the lateral projection of the body portion, the spaced leg portions of the mounting bracket being secured together by an upper and a lower mounting pin, the upper mounting pin pivotally receiving a locking member pivotally supported by the upper pin, and biasing means disposed between the lower pin and the locking member to bias the locking member to a lower or closed position, the mounting bracket mounted on a forward body portion of the vehicle and engaging the upper mounting point on the mounting frame and the implement carrying apparatus engaging the lower mounting point on the mounting frame to secure the mounting frame and the vehicle in operative relationship.

2. An attachment mounting assembly as claimed in claim 1 wherein the mounting frame comprises a pair of laterally spaced upright rails having horizontal extensions extending rearwardly thereof, the horizontal extensions terminating in respective mounting pins, the mounting pins on the mounting frame engaging respective mounting brackets provided on opposite sides of the vehicle, the mounting bracket including a locking mechanism biased toward a closed position, whereby rearward movement of the mounting frame engages the pins carried thereon with respective mounting brackets to bias the respective locking mechanism to an open position to seat the pin therein, the locking mechanism being actuated to carry a forward extension thereof over a respective mounting pin to secure the mounting frame to the vehicle at the upper mounting point of the assembly.

3. An attachment mounting assembly as claimed in claim 1 wherein the upper leg portion of the mounting bracket and its complementary spaced plate include aligned triangular slots provided therein, the slots having respective lower forward guide surfaces and rounded terminal ends, the terminal ends of the slots on the mounting bracket receiving the pin on the mounting frame therein when the mounting pin is secured to the vehicle, and the locking member having a complementary slot therein, the locking member including a forward extension having respective concave and convex surfaces, the forward extension of the locking member biased across the slot in the mounting bracket when the mounting frame is disengaged from the vehicle, whereby rearward movement of the mounting frame engages the pins carried thereon with respective mounting brackets to bias the forward extension of a respective locking member away from each slot to seat the pin at the terminal end of the slot when the locking member is biased outwardly thereof.

4. An attachment mounting assembly as claimed in claim 2 wherein the mounting frame includes a rear plate provided on the base portion thereof, the rear plate having respective upper and lower trailing edges, the upper and lower edges of the rear plate being complementary to respective upper and lower edges provided on the implement carrying apparatus, the upper edge of the rear plate forming a triangular slot into which the upper edge of the implement carrying apparatus is complementarily guided, the implement carrying apparatus being aligned in abutting relationship with the rear plate of the mounting frame, thereby placing the respective lower edges of the rear plate and the apparatus in abutting relationship, the apparatus carrying a mechanically actuated wedge which is inserted into a complementary opening in the lower edge of the rear plate to secure the implement carrying apparatus to the mounting frame at the lower mounting point thereof.

5. The attachment mounting assembly as claimed in claim 1 wherein the implement mounting apparatus on the vehicle includes a crossmember disposed adjacent the mounting frame of the assembly at the lower mounting point, and respective protective struts mounted at a lower end of the mounting frame extend rearwardly to engage the crossmember of the implement mounting apparatus, engagement of the protective struts with the crossmember of the apparatus preventing the hydraulic cylinder of the apparatus from rotating the apparatus about the ends of the arms of the vehicle.

6. The attachment mounting assembly as claimed in claim 2 wherein the pins provided at the outer ends of the rearwardly extending channel members of the mounting assembly at the upper mounting point of the frame to the vehicle include outward lateral extensions which overlie the lift arms of the vehicle, thereby to immobilize the lift arms when the mounting frame is secured to the vehicle.

7. The attachment mounting assembly as claimed in claim 1 wherein the mounting frame includes means for mounting and de-mounting the assembly, such means comprising side rails mounted on one side of the mounting frame, the side rails being laterally spaced and having vertically spaced steps provided therebetween to enable an operator to mount and de-mount the assembly, the side rails extending upwardly above the rearwardly extending channels of the mounting frame to provide additional guide rails at the top of the frame for the operator of the vehicle, the upper portions of the guide rails including lateral extensions above the frame at the front and sides thereof.

8. The attachment mounting assembly as claimed in claim 1 wherein the upper mounting point between the attachment and the mounting frame includes a pair of laterally spaced forwardly extending tabs extending outwardly from the vertical beams of the mounting frame, a pair of laterally spaced members provided on the attachment and engageable with the forwardly extending members of the mounting frame and fastening members cooperatively engaging the members on the mounting frame and the members on the attachment to secure them in assembled relation, and respective mounting brackets provided on the mounting frame at the lower end of the mounting frame, the brackets receiving rearward extensions of the attachment, the rearward extensions of the attachment secured in the brackets on the frame by complementary fastening means.

9. An attachment mounting assembly as claimed in claim 8 wherein the lower mounting brackets on the frame extend rearwardly to engage a crossmember of the implement mounting apparatus of the vehicle to restrict rotary movement thereof.

10. An attachment mounting assembly as claimed in claim 1 wherein the mounting bracket includes a Z-shaped member, having a first leg portion extending downwardly and secured to an inside portion of the front body portion of the vehicle, a step portion overlying a lateral outward projection of a front portion of the vehicle body, and an upper leg portion member extending upwardly from the step portion, the bracket having a plate mounted opposite the upper leg portion thereof and laterally spaced therefrom the plate and the upper leg portion of the mounting bracket being secured together by an upper and a lower mounting pin.

* * * * *